United States Patent

Hemdal

[15] 3,668,330

[45] June 6, 1972

[54] ARRANGEMENT FOR CONTROLLING DEVICES TRANSMITTING DIGITAL PULSES IN A COMPUTER CONTROLLED TELECOMMUNICATION SYSTEM

[72] Inventor: Göran Anders Henrik Hemdal, Tyreso, Sweden

[73] Assignee: Telefonaktiebolaget LM Ericsson, Stockholm, Sweden

[22] Filed: Dec. 22, 1969

[21] Appl. No.: 887,098

[30] Foreign Application Priority Data

Jan. 8, 1969 Sweden ....................................185/69

[52] U.S. Cl. ........................................179/18 ES, 179/90 B

[51] Int. Cl. ............................................................H04q 1/32

[58] Field of Search.............179/90 BB, 90 B, 90 R, 175.2 A, 179/18 ES, 16 EC

[56] References Cited

UNITED STATES PATENTS

| | | | |
|---|---|---|---|
| 3,385,931 | 5/1968 | Lucas et al. | 179/18 EB |
| 3,291,913 | 12/1966 | Hanna et al | 179/16 EC |

FOREIGN PATENTS OR APPLICATIONS

| | | | |
|---|---|---|---|
| 1,274,668 | 8/1968 | Germany | 179/16 EC |

*Primary Examiner*—Kathleen H. Claffy
*Assistant Examiner*—Thomas W. Brown
*Attorney*—Hane & Baxley

[57] ABSTRACT

There is disclosed an arrangement in a stored program controlled telephone exchange for controlling devices emitting pulse series corresponding to dialed digits. The arrangement comprises a number of buffer units which are scanned, when a certain digit is to be emitted from a certain device, in order to determine either if there exists an idle unit from which the pulse series emitting device could be controlled or if there exists a unit in which there are a required number of control signals corresponding to the certain digit, in which latter case these signals are supplied to the device in question.

4 Claims, 1 Drawing Figure

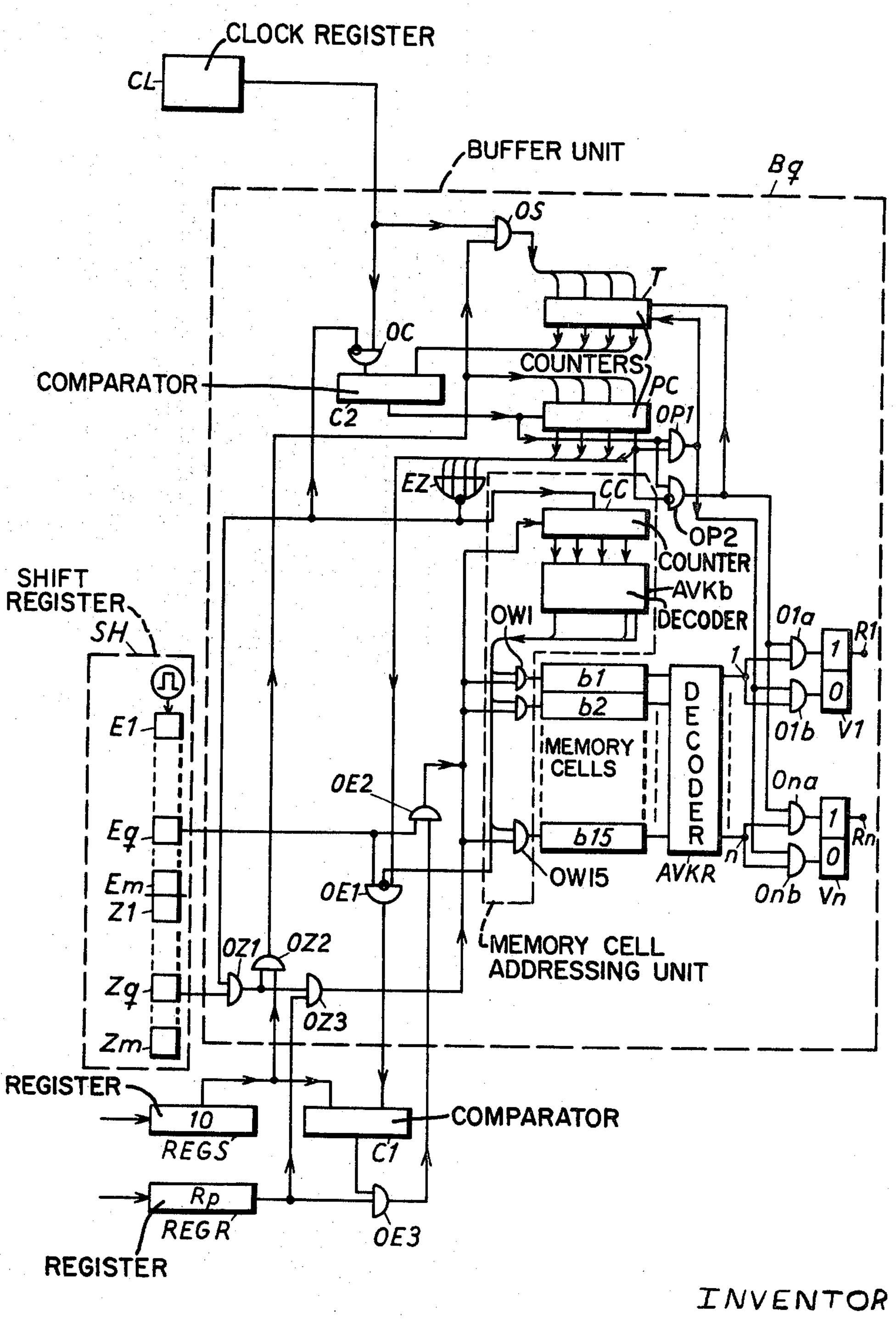
INVENTOR
GÖRAN ANDERS HENRIK HEMDAL
BY Hane and Baxley
ATTORNEYS

ARRANGEMENT FOR CONTROLLING DEVICES TRANSMITTING DIGITAL PULSES IN A COMPUTER CONTROLLED TELECOMMUNICATION SYSTEM

The present invention relates to an arrangement for controlling devices transmitting digital pulses in a computer controlled telecommunication system, whereby the length of the pulses as well as the length of the pulse intervals consist of a number of periods of a determined frequency.

When establishing telephone connections the devices included in the connections are controlled by the digit combination which is dialed by the caller. In most telephone systems each digit is transmitted as a number of pulses of determined length the number corresponding to the value of the digit, the pulses being separated by pulse intervals of likewise determined length. Such pulses are generated by a make and break relay. This melted has the drawback in that the information is transmitted at a low rate, and therefore this procedure has been abandoned, particularly for information transmission between two telephone exchanges. However, a modern computer controlled telephone exchange must be provided with equipment for transmission of digit impulses because the exchange, as a rule, must cooperate with the exchanges of the older type. This can be achieved when each pulse transmitting relay is alloted on the one hand, a memory word register where the sum of the number of pulses and pulse intervals which are to be generated is stored and, on the other hand a clock word register whose contents is compared with the value in a clock register which is stepped forward a determined number of steps during the time interval corresponding to a pulse and to the time interval corresponding to a pulse interval (pause) respectively. When a number of pulses corresponding to a certain digit are to be produced by the relay, the sum of a number of pulses and pulse intervals of the digit are stored in the memory word register. At the same time, one plus the value held in the clock register is stored in the clock word register. At the next step of the clock register when the value stored in the clock register coincides with the contents of the clock word register the relay is activated, the contents of the memory word register are reduced by one and the contents of the clock word register are increased by a value which constitutes the number of steps of the clock register corresponding to the pulse length. Accordingly, at coincidence between the contents of the clock register and the clock word register the pulse terminates and the relay is deenergized. The contents of the memory word register is once again reduced by one and the contents of the clock word register is increased by a value which constitutes the number of steps of the clock register corresponding to the pulse interval. In this manner the contents in the memory word is counted down to zero, whereby the clock word register is given a value which the clock register can not have. This method demands, however, a very large memory space as the number of devices transmitting digits is large. Furthermore, both the traffic dependent and traffic independent work of the computer becomes large, as a great number of instructions must be run through for each adjustment of a relay and even clock words belonging to relays not to be adjusted have to be scanned at each word of the clock register. pulses In order to reduce the memory space required and the traffic independent work it is possible, instead of allotting each device transmitting digits special memory work registers to utilize a number of buffer registers in which the address to a device transmitting digits as well as information corresponding to the digit which is to be transmitted, are stored. This information can consist of the number of pulse and pulse intervals corresponding to the digit whereby the buffer registers alternately are scanned with an interval corresponding to the pulse length and an interval corresponding to the pulse interval. During each of the scannings, the value of the mentioned information is reduced by one and whose relay the address is stored in the buffer register is switched on and off. This continues until all the pulses in the digit in question have been generated. The traffic dependent work will of course be larger for this process than for the above discussed method since the device in question must be addressed from the buffer register. However, this is compensated for by the reduced traffic independent work. It is, however, necessary that the devices be operated synchronously. If this were not the case each buffer register must be investigated separately for its contents and the same traffic dependent work is obtained as at the first discussed method. The synchronous pulse transmission causes, however, the power needed in the station to periodically increase to a very high value. Consequently, large currents are needed from the power supplying batteries. An object of the present invention is therefore to provide an arrangement for generating digit pulses having the advantages of the buffer registers but which do not require synchronized digit pulses. The characteristics of the invention will appear from the claims appended to the description.

The invention will be explained in greater detail with reference to the accompanying drawing which shows an arrangement according to the invention. The arrangement will first be explained in its main parts and then be explained in detail by means of an operating example.

In the drawing two registers are denoted by references REG R and REG S respectively. When a digit is to be generated by a device, information about the identity of the device is stored in register REG R and information concerning the number of pulses and pulse intervals of the digit is stored in register REG S. A shift register is denoted by reference SH, the shift register being provided with successively activable outputs which are connected to to a number of buffer units B1, ..B*q*, ..B*m*, of which, for simplicity's sake, only the unit B*q* is shown in the drawing. The arrangement furthermore includes a clock register CL which is connected to all the buffer units, and controls the buffer units as will be explained below.

The buffer unit B*q* consists of a number of memory cells b1, ..15 where address information to devices R1 ..R*n* in which digit information is generated can be registered via and-gates OW1, ..OW15. The outputs of the memory cells are connected to a decoder AVKR so that a stored address information activates a determined output of the outputs 1...*n* of the decoder AVK R. The registering of address information in the different cells is controlled by a counter CC which, via a second decoder AVK *b*, is connected to the gates OW1, ..OW15 so that the stepping of the counter successively opens the gates. Counter CC, decoder AVK *b* and gates OW1 to OW15 comprise a memory cell addressing means. The buffer unit Bq includes, furthermore, a digit pulse counter PC which at each moment indicates how many further pulses and pulse intervals there are to be produced by the devices whose identities are stored in the memory cells. Counter PC receives count down pulses from a comparison circuit C2. Circuit C2 has its first input connected to the clock register CL via an and-gate OC and its second input connected to a time counter T acting as a clock word register, the function of which will be explained more in detail below. The comparison circuit C2 generates an output signal when the values represented by its input signals are equal. The output of the comparison circuit C2 is moreover connected to two and-gates OP1 and OP2. Gate OP1 has its second input connected to the last digit position of the counter PC. Gate OP2 has a second and inverting input connected to said last digit position. At each countdown pulse either the output of the gate OP1 or the output of the gate OP2 will be activated dependent on whether the sum of the remaining pulses and pulse intervals is odd or even, i.e. if a pulse or a pulse interval shall be initiated. The outputs at these gates are connected to and-gates 01*a* ..0*na* and 01*b* ..0*nb* respectively, the second input of each of the gates being connected to the output with the corresponding number of the decoder AVKR. The outputs of the gates 01*a* ..0*na* are connected to the setting inputs of the bistable flip-flop circuits VI ..V*n* whose set outputs are connected to the corresponding digits transmitting devices R1 ..R*n*, while the outputs of the gates 01*b* ..0*nb* are connected to the resetting inputs of the respective flip-flop circuits. Furthermore the output of the and-gate OP1 is connected to a first stepping input of the time counter T and the output at the gate OP2 is connected to a second stepping input of this counter. Pulses to these stepping inputs step the counter a number of clock pulses of the clock register CL corresponding to pulse and pulse interval respectively, i.e., if the stepping forward period of the clock register for example is 20 mS (milliseconds, the pulse length 60 mS and the pulse interval 40 mS the counter is stepped forward three steps from the first stepping input and two steps from the other. Thus the counter PC will be counted down with intervals of alternatively 60 and 40 mS duration. When the counter PC is counted down to zero the inverting output of an or-circuit EZ is activated since the outputs of the or-circuit are connected to the output of the pulse counter. The gate OC is blocked, its inhibiting input is connected to the output of circuit EZ, and the down counting of the pulse counter ceases.

How the above described arrangement works is best explained by means of an example. Suppose that the digit information 5 is to be sent out from the typical device Rp. The sum of the pulses and pulse intervals for this digit increased by one (10) is stored in the register REG S and the address of device Rp is stored in the register REG R. The value stored in the register REG S is brought to the one input of a comparison circuit C1. Furthermore a stepping forward of the shift register SH starting at the stage E1 is initiated. The stage E1 comparison an output connected to a buffer unit B1 (not shown in the figure), and successive stages are connected to the other buffer units whereby the buffer units in turn are scanned. It should be pointed out that the time of the scanning process is essentially less than the time of the digit impulse. What this scanning means appears from the following description of the procedure occuring when the buffer arrangement B*q* is scanned. At the activating of the output of the stage E*q* the value stored in the pulse counter PC is transmitted, via the and-gate OE1 to the second input at the comparison circuit C1 if the counter CC does not indicate that all the buffer cells b1, ..b15 are occupied. Note that an output of decoder AVK*b* is connected to the inverting input of the gate OE1. If the value in the pulse counter PC coincides with the value in the register REG S, which might be the case if the pulse counter is being counted down from a sum 10, an output signal is obtained from the comparison circuit C1 which opens an and-gate OE3. The contents in the register REG R, via this gate and the gate OE2 opened by stage E*q* of the shift register SH, are transmitted to the one input of the gates OW1, OW15. Which of these gates is opened and in which buffer cell the value R*p* is stored depends on the value in the counter CC. In order to make the next storage take place in the following buffer cell the counter CC is stepped forward since its stepping input is activated from the output of the gate OE2. In this manner the digit 5 will be transmitted from the device R*p*. The reading from the register REG R also entails that the stepping forward of the shift register SH stops (not shown in the figure). If equality is not obtained in the comparison circuit C1 the progress of the shift register is continued and if no equality is found when all the buffer units have been scanned (at the stage E*m*) the shifting of the shift register still continues. Thus stages Z1, ..Z*m* are successively activated, these stages being connected to a buffer unit with a corresponding index in the manner shown at the stage Z*q* connected to the buffer unit B*q*. As appears from the figure this stage is connected to one input of an and-gate OZ1 the second input of which is connected to the output of the or-circuit EZ. This output is activated when the pulse counter is set to zero, i.e. when the buffer unit is idle. If this is the case the shifting of the shift register is interrupted and the gate OZ1 is opened whereby the contents of the register REG S is transmitted to the pulse counter PC via the gate OZ2 and the contents of the register REG R is stored in the memory cell b1 via the and-gates OZ3 and OWl, as the counter CC has been set to zero from the output of the gate EZ. From the output of the gate OZ2 a signal is obtained which opens the gate OS whereby the value in the clock register C1 is stored in the time counter T. Accordingly, the transmission of the digit impulses from the device R*p* takes place in accordance with what has earlier been described. If, however, the pulse counter is not set to zero the shifting of the shift register goes on until a counter set to zero is found. If this is not the case a new shifting procedure of the shift register is started after 20 mS whereby either a counter might have obtained a value corresponding to that of the register REG S or have been set to zero.

It is obvious from the description that each buffer unit can consequently be used for controlling several devices transmitting digital pulses whereby the number of buffer units can be reduced essentially compared with the method described by way of introduction. Consequently the operation of the different buffers need not by synchronized whereby the drawback which the use of earlier buffer units entailed is eliminated.

I claim:

1. An arrangement in a computer controlled telecommunication system for transmitting pulse trains of required numbers of digit pulses from address-defined output devices comprising a first register means for receiving a number associated with the number of digit pulses to be transmitted in a pulse train, second register means for receiving the address of the output device to transmit said pulse train, a scanning means having a first plurality of scan outputs which are sequentially energized and a second plurality of scan outputs which are sequentially energized, a first comparator means having a first input connected to the output of said first register means, a second input, and an output which is activated when number-representing signals at the inputs thereof have a particular relationship, at least one buffer unit, said buffer unit comprising a pulse generating means for generating digit pulses, a plurality of memory cells for storing addresses of said output devices, first logic means for connecting said memory cells and said pulse generating means to said output devices for permitting the passage of digit pulses to particular output devices in accordance with addresses stored in said memory cells, a pulse counting means stepped to an end position by pulses from said pulse generating means, said pulse counting means including end-position indicating means, the count stored in said pulse counting means defining the number of pulses to be generated by said pulse generating means, and position indicating means connected to said pulse counting means, means connected to the particular first scan output associated with said one buffer unit and to said end-position indicating means for presetting said pulse counting means to the number stored in said first register means and for transferring the address stored in said second register means to one of said memory cells, means connected to the particular second scan output associated with said one buffer unit and to said pulse counting means for transferring the number stored in said pulse counting means to the second input of said first comparator means for comparison with the number stored in said first register means, and means operative when the output of said first comparator means is activated for transferring the address in said second register means to an empty memory cell whereby the output device defined by the address stored in said memory cell transmits a number of digit pulses indicated by the count in said pulse counting means which is equal to the number stored in said first register means.

2. The arrangement according to claim 1 and further comprising a clock register associated with at least said one buffer unit which is common for all buffer units and which steps forward with a definite stepping frequency, and said pulse generating means comprising time counter means, responsive to the activation of said particular first scan output, for storing the setting of said clock register, said time counter means being provided with a first and a second stepping forward input in order to obtain a stepping forward by a first and a second definite number of steps, respectively, said pulse generating means further comprising second comparator means for comparing the setting of said clock register with the setting of said time counter means and upon equality producing a second comparator signal by which said pulse counting means is stepped, a second logic means having a first input activated by said second comparator signal and a second input activated in dependence on the number stored in said pulse counting means being odd or even and having two outputs connected each to one of said stepping forward inputs of the time counter means and connected to said at least one input of said first logic means, said first and second definite number of steps respectively defining how many periods of said definite stepping frequency form the length of a pulse and of a pulse interval respectively.

3. The arrangement according to claim 2 wherein said scanning means is activated for each step of said clock register counter, said first scan outputs are energized after said second scan outputs have been energized and said scanning being terminated whenever a signal is present at the output of said first comparator means when a second scan output is energized and whenever an end-position indicating means is activated when a first scan output is energized.

4. The arrangement according to claim 1 wherein said buffer unit further comprises a memory cell addressing means for activating said memory cells sequentially to receive addresses from said second register means.

* * * * *